Figure 1:
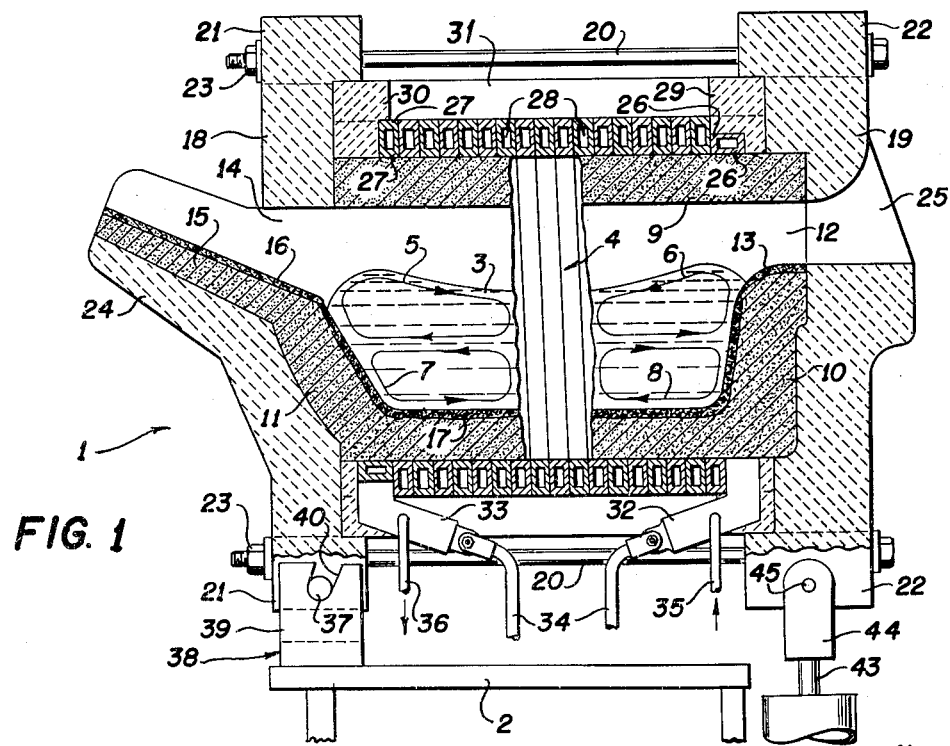

Nov. 7, 1961  O. ZANDER  3,007,986
CORELESS INDUCTION FURNACE
Filed Feb. 6, 1959

INVENTOR.
Otto Zander
BY Charles Crudell.
Attorney

United States Patent Office 3,007,986
Patented Nov. 7, 1961

3,007,986
CORELESS INDUCTION FURNACE
Otto Zander, Duisburg, Germany, assignor to Demag-Elektrometallurgie G.m.b.H., Duisburg, Germany, a corporation of Germany
Filed Feb. 6, 1959, Ser. No. 791,566
7 Claims. (Cl. 13—27)

This invention relates to a coreless induction furnace for metallurgical processing of metal and is particularly directed to a construction employing electromagnetic stirring of the molten bath.

In metallurgical processes, a charge of scrap metal or the like is disposed within a furnace and heated to a reaction temperature at which the charge is reduced to a molten state. Reaction products are added to the molten mass and react with the metal in a predetermined reaction to form an alloy or the like.

A conventional method for reducing the charge of metal to a molten mass and for raising the molten mass to the reaction temperature employs an induction coil magnetically coupled to the metal charge to establish eddy currents within the charge. The eddy currents generate heat which increases the temperature of the metallic charge to the preselected level.

Induction heating has an additional advantage in that the reaction between the supplied field and the eddy currents establishes a circulating flow of the molten charge to establish positive intermixing of the molten metal and the added reaction products.

Induction melting furnaces and the like are formed with a crucible or container having a relatively deep vertical depth and a relatively shallow horizontal depth or perimeter. The heating and stirring coil is wound about the container with its axis concentric with the axis of the vertically disposed container. The coil is energized and the resultant magnetic flux penetrates into the metallic charge within the container. The molten metal tends to follow the path of the magnetic field of the furnace coil and a convex meniscus is formed at the bath surface which tapers from the center of the bath toward the container walls and which increases with decreasing frequency. For the vertically disposed container and coil, the flow of the liquid metal in the bath surface is therefore generally from the central portion of the bath to the crucible wall. The slag which is formed during the reaction process and the reaction products which are added to the charge tend to accumulate on the upper surface of the molten bath and are mixed by the circulating metal current into the molten mass.

In the vertically disposed furnace unit, the surface movement of the metal to the crucible wall carries the captured slag and other reaction products into contact with the crucible wall which is rapidly destroyed by erosion. The outward streaming of the slag and the reaction products with the surface of the molten metal also crowds the reaction material to the edge of the bath where mixing is relatively low and consequently, the completeness of the desired reaction and the rate of the reaction is reduced.

In accordance with the present invention, an induction heating and stirring coil is arranged with the axis of the coil extending in a horizontal direction. The coil is generally centrally arranged about the mass of the metal charge to give a vigorous flow of the surface charge and the added reaction products. With the coil disposed with its axis extending in a horizontal direction, a generally concave meniscus is established and the movement of the surface metal is generally from the wall of the crucible to the central portion of the molten charge. The slag and other reaction products on the surface are consequently carried away from the wall of the container and distributed rapidly in all directions and drawn directly into the bath.

The inward flow of the surface of the molten mass and the reaction products reduces the erosion of the container walls and provides a rapid and complete intermixing and reaction between the metal charge and the reaction materials. The principal axis of the furnace container extends in a horizontal direction and establishes a large surface which further increases the completeness and rapidity of the reaction.

An input opening and a discharge opening are conveniently established at opposite ends of a horizontally mounted furnace. The furnace is consequently particularly adapted to "flow-through" type furnaces which receive molten material from a melting furnace and superheat the received material.

An object of the present invention is to provide a mixing furnace having an induction stirring coil arrangement which establishes a vigorous movement of the molten mass without corresponding erosion and damage to the furnace wall.

The drawing furnished herewith illustrates the best mode presently contemplated for carrying out the invention.

Figure 2:
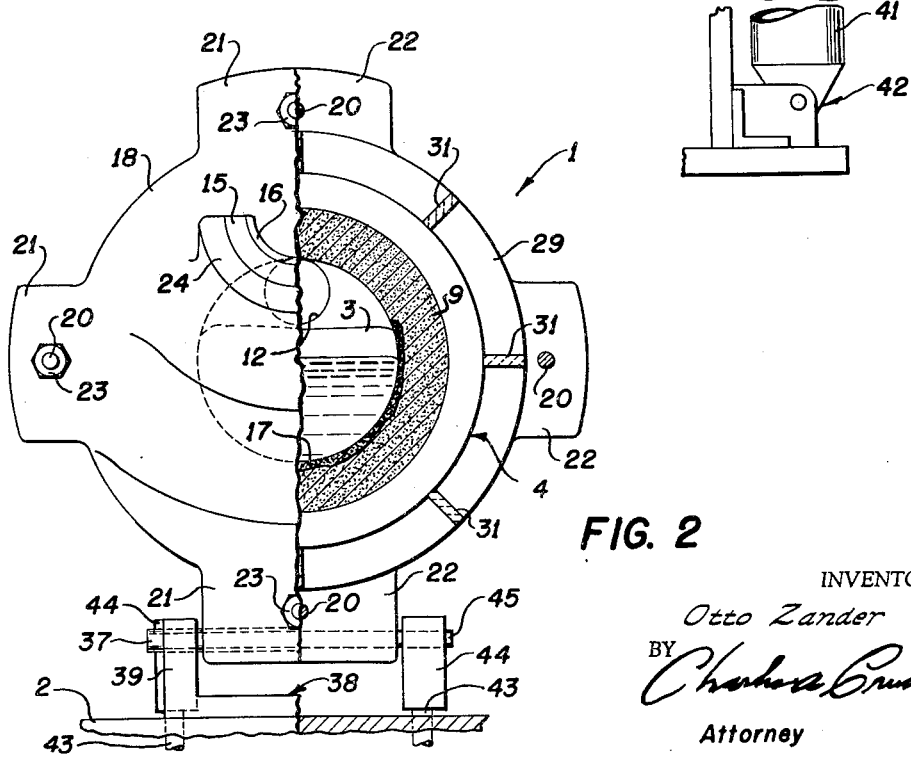

In the drawing:

FIGURE 1 is a vertical section through a tiltable melting furnace constructed in accordance with the present invention; and FIG. 2 is an end elevational view of the melting furnace with parts broken away to show certain details of construction.

Referring to the drawing, a melting furnace 1 is pivotally supported on a base 2. The furnace 1 is adatped to receive a metal charge 3 of iron or the like for subsequent processing and mixing with suitable reaction products, not shown. An induction heating and stirring coil 4 is wound about the melting furnace 1 and constitutes a primary winding of a transformer with the metal charge 3 constituting the secondary winding. Energization of the induction heating coil 4 establishes circulating eddy currents within the metal charge 4 which reduce the metal charge to a molten state, as shown, and also establishes four circulating currents of the molten metal generally shown by the closed loops 5, 6, 7 and 8, as more fully described hereinafter.

The furnace 1 includes a tubular refractory container 9 which is preformed in any suitable manner as by conventional ramming of a granular refractory material into the desired configuration. The container 9 is formed with integral end walls 10 and 11 which substantially close the container. An input opening 12 is formed in the upper portion of the end wall 10 to allow charging of the container 9. A refractory cement lining 13 covers the surface of the opening 12 to seal the surface of the opening and prevent washing of the surface when the molten or solid metal and other products are fed into the container 9. A discharge opening 14 is formed in the upper portion of the opposite end wall 11. A refractory discharge spout 15 is integrally formed with the end wall 11 and extends radially upwardly and axially from the discharge opening 14 to give a controlled discharge of the molten metal by suitable tilting of the furnace 1. A refractory cement lining 16 also seals the surface of discharge opening 14 and discharge spout 15 to prevent destruction thereof by the discharging molten products.

The molten mass of metal 3 within the container 9 sinters the adjacent base and wall of the refractory material normally to a depth of about three eighths of an inch to form a hard, sintered lining 17. The sintered liner 17 effectively seals the surface of the refractory container 9 against leakage of molten metal 3. The outer portions of the refractory container 9 however remain in a substantially granular form and serve to support the inner-sintered liner, establish thermal insulation and create a secondary barrier against the leakage of molten metal 3 in case a crack does develop in the sintered liner 17.

A pair of transite mounting posts 18 and 19 support the refractory container 9 upon the base 2 with the principal axis of the container extending in a horizontal direction. The posts 18 and 19 include central circular portions which are recessed to receive the opposite ends of the refractory container 9. A plurality of clamping bolts 20 are circumferentially arranged about the furnace 9 and extend through aligned openings in correspondingly aligned projections 21 and 22 of the mounting posts 18 and 19. Hex nuts 23 are threaded onto the bolts 20 to securely clamp the container 9 between the posts.

The forward mounting post 18 includes an integrally formed, axially extending lip 24 which is adapted to underlie the outer surface of the discharge opening 14 and spout 15 to rigidly back up and support the spout 15 during the pouring operation.

The back mounting post 19 has a funnel shaped input opening 25 aligned with the input opening 12 in the end wall 10 to allow feeding of material into the container 9.

The induction heating coil 4 encircles the refractory container 9 between the mounting posts 18 and 19 with the end turns 26 and 27 of coil 4 spaced from the adjacent supporting posts. The induction heating coil 4 generally encompasses or is co-extensive with the charge retaining portion of the refractory container 9 between the input opening 12 and the discharge opening 14. Thus, the entire molten charge of metal 3 is subjected to the magnetic flux from the coil 4.

The illustrated coil 4 is formed from a generally rectangularly shaped conductor which is tightly wound about the refractory container 9. The conductor of the coil 4 is hollow to establish a cooling passage 28 for the circulation of water or other suitable cooling fluid through the induction coil 4 to carry away the heat generated within the coil. The opposite end coil turns 26 and 27 are twisted to dispose the longest axis of the coil turns generally parallel to the axis of the container.

Suitable refractory brick supports 29 and 30 are disposed between the ends of coil 4 and an adjacent axially recessed portion of the mounting post 18 and 19. The brick supports 29 and 30 extend axially over the adjacent end turns 26 and 27 into abutting relation to the next adjacent coil turns.

A plurality of transite crossbraces 31 extend axially between the mounting posts 18 and 19 and into the brick supports 29 and 30 within the recesses of the mounting posts. The transite crossbraces 31 are circumferentially arrayed and engage the outer surface of the induction heating coil 4 to rigidly clamp the coil in position against the large magnetic forces tending to move the induction heating coil turns incident to the current flow through the coil.

Input and output terminals 32 and 33 are secured to opposite ends of the induction heating coil 4 through suitable openings provided in the brick supports 29 and 30. The terminals 32 and 33 are connected to an incoming power cable 34 to provide connection to a suitable source of alternating or pulsating current, not shown, for energization of the coil 4.

The current establishes a traveling magnetic field, not shown, through the metallic charge 3 which induces circulating eddy currents, not shown, within the charge. The heat generated by the eddy currents reduce the metallic charge to a molten state. Subsequently, the reaction between the eddy currents and the supplied magnetic field establish forces which cause the metal flow as at 5—8.

The current flow in the coil 4 is large and the heat generated thereby rapidly destroys the coil 4 if adequate cooling is not provided. The respective terminals 32 and 33 are also connected to an input water line 35, shown to the right in FIG. 1, and to a discharge water line 36, shown to the left in FIG. 1, to circulate water or other suitable fluid through the passage 28 of induction heating coil 4 during the operation thereof.

The furnace 1 is pivotally supported upon the base 2 for selective positioning to a discharge position, not shown, as follows:

A pivot pin 37 extends through the lower projection 21 of the container mounting post 18 in a direction transversely of the container 9. A pivot bracket 38 is rigidly secured to the base 2 and includes spaced side arms 39 which extend upwardly on opposite sides of the projection 21 of mounting post 18. The upper ends of arms 39 are similarly slotted as at 40 to pivotally receive the opposite ends of pivot pin 37. The slot 40 extends upwardly and rearwardly to prevent outward movement of the pin 37.

A pair of hydraulic cylinders 41 are mounted on opposite sides of the rear mounting post 19 and connected to post 19 to pivot the furnace 1 about the forward pivot pin 37. Each of the cylinders 41 operates and is connected in substantially the same manner and therefore only one is shown and described in detail.

A pivotal connector 42 is secured to the lower end of the cylinder 41 and to the base structure 2 adjacent the rear mounting post 19. A piston rod 43 extends upwardly from the opposite end of the cylinder 41 to the side of post 19 and terminates in a pivotal connector 44. A pin 45 extends laterally through the mounting post 19 and into the slotted connector 44. Actuation of the hydraulic cylinders 41 positions the piston rod 43. When piston rod 43 is extended, the furnace 1 pivots about the forward pivot pin 37 to the discharge position, not shown.

The operation of the illustrated embodiment of the invention is summarized as follows.

The induction heating coil 4 is connected to a source of suitable alternating or pulsating D.C. current through the power cables 34. The coil 4 is conventionally energized from an 800 to 1400 volt alternating current source having a frequency of approximately 180 cycles per second. The current in the induction heating coil 4 establishes an alternating magnetic flux which penetrates into the molten charge 3 and establishes circulating eddy currents, not shown, within the molten mass 3.

Where the charge 3 is initially cold scrap metal pieces of assorted dimensions and size, the metal is separated by a large percentage of voids. The induced eddy currents progressively reduce the metal pieces to a molten charge with a consequent decrease in volume. Additional cold metal may be added as the charge changes to the molten state.

Subsequent to the reduction to a molten state, the charge 3 is stirred through electromagnetic action. The eddy currents induced in the molten charge reacts with the magnetic field from coil 4 to establish forces within the molten mass which create the circulating metal currents 5 through 8.

The horizontally wound coil 4 creates movement of the surface of the molten charge 3 from the wall of container 9 toward the center of the charge and then downwardly into the mass, as shown by the upper portions of the loops 5 and 6. The slag and added reaction products, not shown, which accumulate on the surface are carried away from the sintered side wall to the middle of the bath.

The carrying of the slag and reaction products on the surface of the molten mass 3 away from the container wall 17 reduces the erosion and destruction of the sintered liner 17. Further, the slag and reaction products are rapidly distributed over the surface of the molten charge and then drawn downwardly into the charge without hindrance or interference. Consequently, good intermixing of the reaction products and the molten charge is established.

Although the surface of the molten metal 3 immediately adjacent the sintered wall 17 tapers upwardly to the crest of the concave meniscus, the surface area is very small and only an inappreciable quantity of the slag and reaction products fall downwardly on to the adjacent wall. Further, the molten metal is biased upwardly from the wall 17 and the velocity of any products moving downwardly to the wall is generally quite low.

The two bottom metal currents 7 and 8 have their upper surfaces directed toward the sintered wall 17 of container 9 in the middle of the molten charge and the return paths along the bottom of the container. The lower molten metal currents 7 and 8 do not carry the slag and reaction products to the wall with any degree of force and erosion is not a serious problem.

The large surface of the molten charge 3 which results from the horizontally disposed tubular container 9 provides greater distribution of the reaction products and increases the speed of the desired reaction.

When the reaction process is completed, the hydraulic cylinders 41 are actuated to raise the back mounting post 19 and pivot the furnace about pivot pin 37 to the discharge position, not shown. The molten charge 3 then discharges through the opening 14 and spout 15 to any suitable receiving device, not shown.

The cylinders 41 are subsequently actuated to return the furnace 1 to the normal position for receipt of a subsequent charge of metal.

Although a tilting batch process furnace is illustrated, the horizontally disposed coil is applicable to continuous flow-through furnace or the like by suitable design of the input and output openings.

The present invention provides a heating and mixing furnace having intensive surface movement of the molten charge without the conventional high degree of erosion at the furnace walls. The furnace provides efficient and complete mixing of the molten metal and the reaction products and accelerates the speed of the reaction.

Various modes of carrying out the invention are contemplated as being within the scope of the following claims particularly pointing out and distinctly claiming the subject matter which is regarded as the invention.

I claim:

1. In a furnace having a container constructed and arranged to support a molten charge of metal, an induction stirring coil horizontally wound about the center of said container and disposed in a substantially concentric relation with respect thereto to establish a vigorous stirring movement of the molten metallic charge with the surface of the charge moving away from the wall of the container and toward a central portion of the molten charge.

2. In an induction furnace constructed and arranged to receive a metallic charge, a tubular refractory container having end walls substantially closing the container and adapted to hold a molten metallic charge, said container being mounted with the axis extending horizontally, an inlet opening in the top portion of one end wall, a discharge opening in the opposite end wall, and a horizontally wound induction heating coil encircling said container between said input opening and said discharge opening and constructed and arranged to establish electromagnetic stirring of the molten charge with the upper surface flowing away from the walls of the container to the center of the molten charge.

3. In a coreless induction melting furnace, a container mounted with a horizontal axis and constructed and arranged to receive a metallic charge, and an induction stirring coil horizontally wound about the center of said container and disposed in a substantially concentric relation with respect thereto to melt said metallic charge and to establish a vigorous stirring movement of the molten charge with the surface of the charge moving from the wall of the container toward a central portion of the charge.

4. In a coreless induction melting furnace constructed and arranged to receive a metallic charge, a refractory tubular container having end walls defining a chamber to receive a metallic charge, said tubular container being horizontally mounted to form a long shallow chamber, an inlet opening in the top portion of one end wall, a discharge opening in the top portion of the opposite end wall, and an induction heating and stirring coil encircling said container substantially coextensively with said chamber and constructed and arranged to establish a magnetic field penetrating said molten mass and thereby reduce the charge to a molten state and to subsequently establish electromagnetic stirring of the molten charge with the surface of the molten charge generally flowing away from the walls of the container to the center of the molten charge.

5. In a coreless induction melting furnace, a tubular container disposed with the axis extending horizontally and having end walls, said container having charge receiving and discharging openings in opposite end portions, a pair of mounting posts constructed and arranged to engage the opposite end walls of the container to support the container, an induction stirring coil encircling the container between said mounting posts, and support means constructed and arranged to support said container in a horizontal position and to selectively tilt the container to a discharge position.

6. In a coreless induction melting furnace, a tubular container disposed with the axis extending horizontally and having end walls, said container having charge receiving and discharging openings in opposite end portions, a pair of mounting posts constructed and arranged to engage the opposite end walls of the container to support the container, an induction stirring coil wound about the container between said mounting posts, a plurality of circumferentially arranged braces extending axially between the mounting posts, a plurality of longitudinally extending clamping rods extending longitudinally of the container and through aligned openings in the mounting posts to securely clamp the container and the coil and the braces between said mounting posts, and support means constructed and arranged to support said container in a horizontal position and to selectively tilt the container to a discharge position.

7. In a coreless induction melting furnace having a horizontally mounted elongate furnace body which forms a chamber for receiving a metallic charge, and an induction heating and stirring coil encircling said container and being substantially coextensive therewith for establishing a magnetic field which penetrates said molten mass and thereby reduces the charge to a molten state and to subsequently establish magnetic stirring of the molten charge with the surface thereof generally flowing away from the ends of said chamber and toward the center thereof.

References Cited in the file of this patent

UNITED STATES PATENTS

| 1,810,866 | Williams | June 16, 1931 |
| 2,144,886 | Mars et al. | Jan. 24, 1939 |

FOREIGN PATENTS

| 935,452 | Germany | Nov. 17, 1955 |